United States Patent [19]
Sugiyama et al.

[11] Patent Number: 5,432,609
[45] Date of Patent: Jul. 11, 1995

[54] TWO-DIMENSIONAL COLORIMETER

[75] Inventors: Masami Sugiyama, Toyonaka; Takao Sakai, Habikino, both of Japan

[73] Assignee: Minolta Co., Ltd., Osaka, Japan

[21] Appl. No.: 177,843

[22] Filed: Jan. 5, 1994

[30] Foreign Application Priority Data

Jan. 6, 1993 [JP] Japan ................................. 5-000692

[51] Int. Cl.⁶ ................................................ G01J 3/51
[52] U.S. Cl. .................................... 356/405; 356/418; 356/419
[58] Field of Search ............... 356/402, 405, 406, 407, 356/416, 418, 419

[56] References Cited

U.S. PATENT DOCUMENTS 5,033,821  7/1991  Hama et al.
5,175,697 12/1992  Kawagoe et al. ................... 364/526

FOREIGN PATENT DOCUMENTS 58-22929   2/1983  Japan.
58-174820 10/1983  Japan.
64-38617   2/1989  Japan.

Primary Examiner—F. L. Evans
Attorney, Agent, or Firm—Price, Gess & Ubell

[57] ABSTRACT

A two-dimensional colorimeter focuses light through a beam splitter onto a rotary filter so that a first light receiving element can receive light from multiple points on a sample. A rotating filter can provide multiple measurements based upon different wavelengths of light. A portion of the light from the beam splitter also contacts a spectral sensor which separates the light from a particular point into primary wavelength elements which are converted into electrical signals. Based upon these primary wavelength elements, the first signals from the light receiving element are corrected. As a result, the measurement of chromaticity of multiple points on a sample can be performed accurately using a device of simple construction.

7 Claims, 6 Drawing Sheets

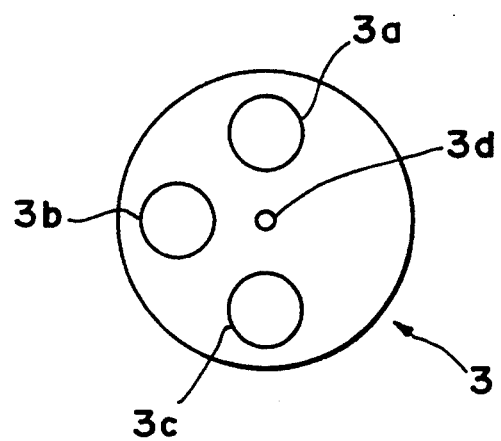

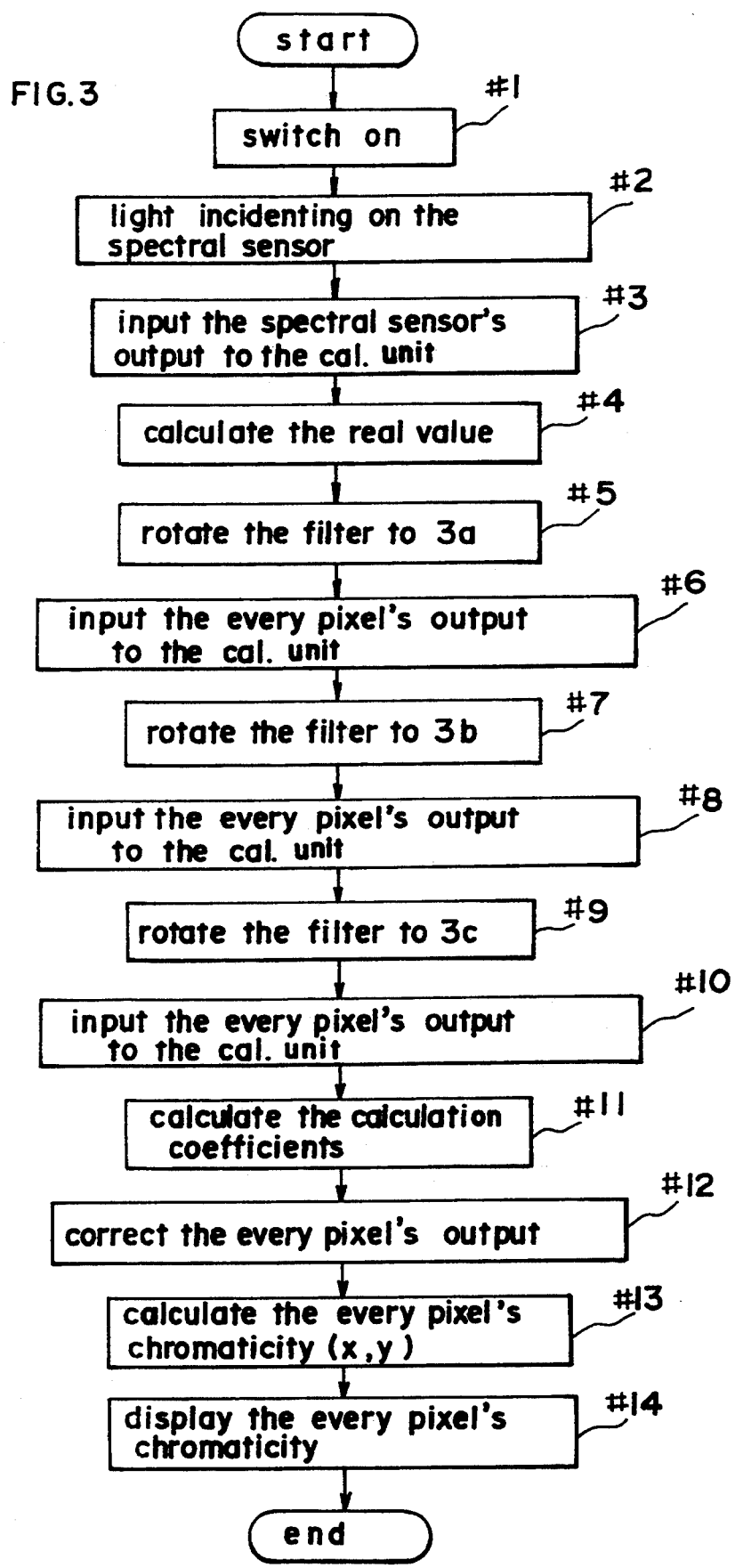

TWO-DIMENSIONAL COLORIMETER

BACKGROUND OF THE INVENTION

1. Field of the Invention

This invention pertains to a two-dimensional colorimeter to measure the chromaticity of various samples at multiple points.

2. Description of the Prior Art

Color is considered increasingly important in various industrial areas. In the areas of painting, printing, textile, ceramics, agriculture, forestry and fishery, as well as in many other areas, chromaticity data such as spectral reflectance and calculated chromaticity of various samples are used in production lines and elsewhere.

Generally, spectrophotometers and photoelectric colorimeters are used for the measurement of chromaticity in the areas described above. In the case of a spectrophotometer, chromaticity is measured by separating the light from the sample into primary wavelength elements using a diffraction grading or spectral filter and detecting the intensity of each primary wavelength element. As a result, a spectrophotometer is capable of accurately measuring absolute chromaticity. However, the construction necessary for performing spectral separation is complex, which makes the equipment large in size as well as expensive.

On the other hand, a photoelectric colorimeter has optical filters approximating the tristimulus values, and measures the chromaticity by detecting the intensity of the light passing through these optical filters. Consequently, a photoelectric colorimeter can be an inexpensive instrument with a simple construction. However, because the method of measurement is simpler than that of a spectrophotometer, accurate measurement cannot be obtained with this type of colorimeter.

In order to measure the color irregularity, etc. of a sample, it is necessary to employ a two-dimensional colorimeter which can measure chromaticity at multiple points on the sample surface. If a spectrophotometer is used for the purpose of the two-dimensional colorimeter to obtain two-dimensional chromaticity data, while accurate measurement can be obtained, the equipment becomes complex and large. On the other hand, if a photoelectric colorimeter is used to obtain two-dimensional chromaticity data, while the equipment can be made small and relatively simple to construct, accurate measurement cannot be obtained. This is a problem not only when measuring the chromaticity of an object but also when measuring the chromaticity of a light source.

The present invention was made in view of the above problems. It is an object of the present invention to provide a two-dimensional colorimeter of simple construction which is capable of accurately measuring chromaticity at multiple points on a sample surface.

SUMMARY OF THE INVENTION

In the present invention, a filter means which allows only certain wavelength elements to pass through it is located in front of a first light receiving means which receives the light from multiple points on a sample. In other words, the chromaticity at the multiple points on the sample is measured by a simple method using the same principle as that employed by a photoelectric colorimeter.

On the other hand, a spectral separating means which separates light into primary wavelength elements is located in front of a second light receiving means which receives the light from one prescribed point among the above multiple points. In other words, the chromaticity at the above one prescribed point among the multiple points is accurately measured using the same principle as that employed by a spectrophotometer.

A correcting means then corrects the measurements for the multiple points on the sample, which are output from the first light receiving means, based on the accurate measurement output from the second light receiving means.

As described above, the two-dimensional colorimeter of the present invention measures the chromaticity at multiple points on a sample using a simple method while accurately measuring the chromaticity at one prescribed point among the multiple points. Then the measurements for the multiple points are corrected based on the accurate measurement. In this way, the chromaticity at multiple points on a sample surface can be measured accurately using a device of simple construction.

Other objects and advantages of the present invention will become apparent from the detailed description to follow taken in conjunction with the appended claims.

BRIEF DESCRIPTION OF THE DRAWINGS

FIG. 2(a) represents a cross-section of a rotary filter.

FIG. 2(b) represents a plan view of the rotary filter.

FIG. 3 is a flow chart showing the operational procedure of the first embodiment of the two-dimensional colorimeter of the present invention.

DETAILED DESCRIPTION OF THE PREFERRED EMBODIMENTS

Figure 1:
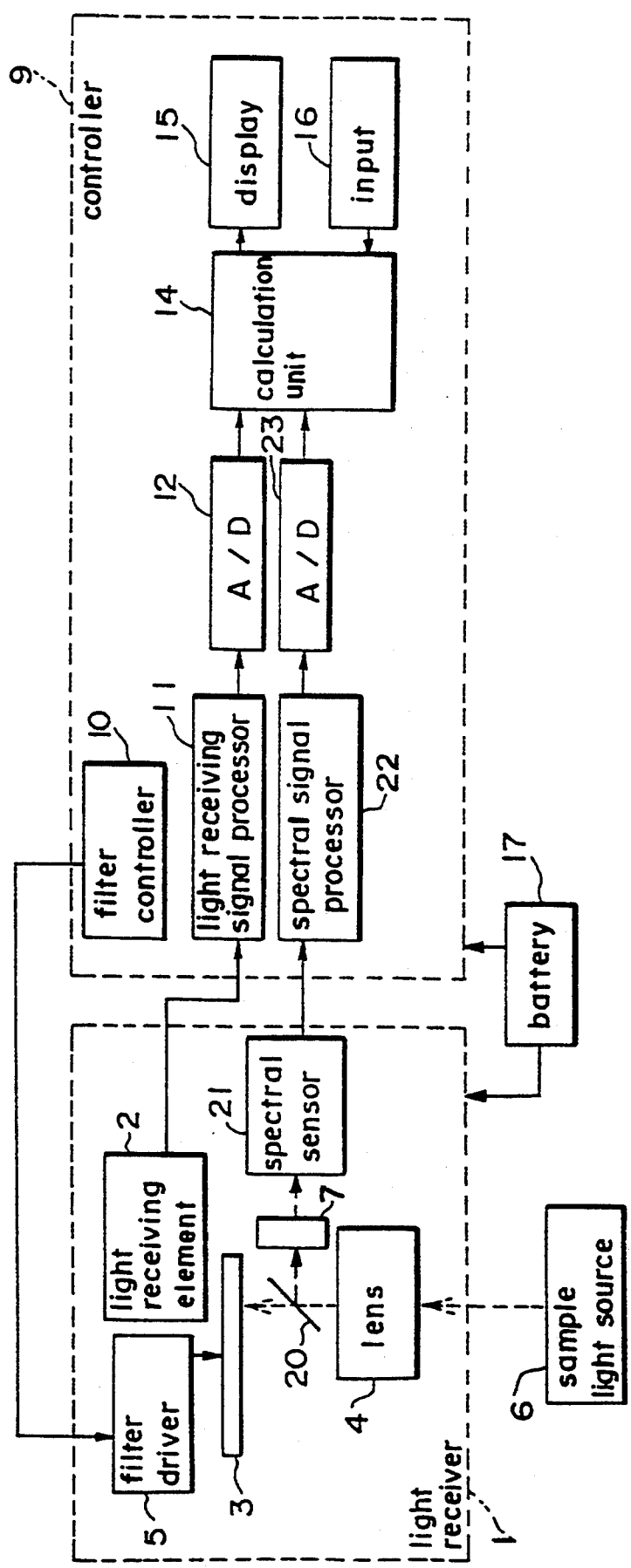
FIG. 1 is a block diagram showing the control system of a first embodiment of the two-dimensional colorimeter of the present invention.

A first embodiment of the colorimeter of the present invention is described with reference to FIGS. 1 through 3. The first embodiment represents an example in which a light source is measured. First, the general construction is described referring to the block diagram shown in FIG. 1.

This colorimeter consists of light receiver 1 and controller 9. Light receiver 1 consists of light receiving element 2, rotary filter 3, optical lens 4, rotary filter driver 5, beam splitter 20 and spectral sensor 21, and receives the light from sample light source 6.

Optical lens 4 causes the light from sample light source 6 to converge. Beam splitter 20 consists of a half-mirror, etc. It reflects some of the incident light while letting other such light pass through. Some of the light made to converge by optical lens 4 is reflected to spectral sensor 21, and other such light is passed through to rotary filter 3. Light receiving element 2 is a two-dimensional light receiving sensor consisting of a monochrome CCD, etc., and receives light from multiple points of sample light source 6. Spectral sensor 21 detects the spectral distribution of the light entering it. A spectral optical filter 7 is located between the sample and the spectral sensor 21 for separating the light into primary wavelengths.

Rotary filter 3 includes filters 3a, 3b and 3c having spectral transmittance characteristics approximate to color matching functions $x(\lambda)$, $y(\lambda)$, $z(\lambda)$, respectively, of the CIE standard XYZ colorimetric reference system, which are incorporated on the radius of rotary filter 3 around and equidistant from axis 3d. Rotary filter driver 5 drives rotary filter 3 and rotates it around axis 3d.

Controller 9 consists of a microcomputer, etc., and includes rotary filter controller 10, light receiving signal processor 11, spectral signal processor 22, A/D converters 12 and 23, calculation unit 14, display output unit 15 and key input unit 16.

Rotary filter controller 10 controls rotary filter driver 5 and rotates rotary filter 3 so that filters 3a through 3c are successively placed on the optical path between optical lens 4 and light receiving element 2. Light receiving signal processor 11 and spectral signal processor 22 convert the output signals from light receiving element 2 and spectral sensor 21, respectively, into electrical signals. A/D converters 12 and 23 convert the output from the above signal processors 11 and 22 into digital values.

Calculation unit 14 has a built-in memory and performs various types of computation. In other words, if the spectral distribution detected by spectral sensor 21 and input through spectral signal processor 22 and A/D converter 23 is $P(\lambda)$, calculation unit 14 performs the following calculation and calculates the real tristimulus values X, Y and Z of sample light source 6.

$$X = \int P(\lambda) \cdot x(\lambda) d\lambda \quad (1)$$

$$Y = \int P(\lambda) \cdot y(\lambda) d\lambda \quad (2)$$

$$Z = \int P(\lambda) \cdot z(\lambda) d\lambda \quad (3)$$

Here, the color matching functions $x(\lambda)$, $y(\lambda)$ and $z(\lambda)$ of the CIE standard XYZ colorimetric reference system are saved in the above built-in memory in advance.

In addition, calculation unit 14 calculates the relational expressions between the real tristimulus values X, Y and Z obtained and the output of a pixel of light receiving element 2 corresponding to the measurement point used for spectral sensor 21. In other words, light receiving element 2 is located such that it includes the point measured by spectral sensor 21 into its light receiving region, and information regarding this measurement point is held by calculation unit 14 in advance. For example, if the output from pixel (n, m) for each filter 3a, 3b and 3c, which is input from light receiving element 2 through light receiving signal processor 11 and A/D converter 12, is $X_1$ (n, m), $Y_1$ (n, m) and $Z_1$ (n, m), respectively, and the pixel corresponding to the measurement point for spectral sensor 21 is ($n_0$, $m_0$), the coefficients of functions f, g and h are calculated in the following relational expressions:

$$X = f\{X_1 (n_0, m_0), Y_1 (n_0, m_0), Z_1 (n_0, m_0)\} \quad (4)$$

$$Y = g\{X_1 (n_0, m_0), Y_1 (n_0, m_0), Z_1 (n_0, m_0)\} \quad (5)$$

$$Z = h\{X_1 (n_0, m_0), Y_1 (n_0, m_0), Z_1 (n_0, m_0)\} \quad (6)$$

As an example of relational expressions, if formulae (7) are used, $$X \: \alpha 0 0 \: X_1 (n_0, m_0)$$

$$Y = 0 \beta 0 \: Y_1 (n_0, m_0)$$

$$Z \: 0 0 \: \gamma Z_1 (n_0, m_0) \quad (7)$$

calculation coefficients $\alpha$, $\beta$ and $\gamma$ are calculated as follows:

$$\alpha = X/X_1 (n_0, m_0) \quad (8)$$

$$\beta = Y/Y_1 (n_0, m_0) \quad (9)$$

$$\gamma = Z/Z_1 (n_0, m_0) \quad (10)$$

Further, calculation unit 14 calculates corrected tristimulus values X(n, m), Y(n, m) and Z(n, m) for each pixel from $X_1$ (n, m), $Y_1$ (n, m) and $Z_1$(n, m) for each pixel based on the above relational expressions. In other words, when formulae (7) are the relational expressions, the corrected tristimulus values X (n, m), Y (n, m) and Z (n, m) for each pixel are calculated as follows:

$$X (n, m) = \alpha \cdot X_1 (n, m) \quad (11)$$

$$Y (n, m) = \beta \cdot Y_1 (n, m) \quad (12)$$

$$Z (n, m) = \gamma \cdot Z_1 (n, m) \quad (13)$$

In addition, calculation unit 14 calculates the chromaticity coordinates x (n, m) and y (n, m) for each pixel from the obtained corrected tristimulus values X, Y and Z for each pixel as follows:

$$x (n, m) = X (n, m) / \{X (n, m) + Y (n, m) + Z (n, m)\} \quad (14)$$

$$y (n, m) = Y (n, m) / \{X (n, m) + Y (n, m) + Z (n, m)\} \quad (15)$$

Display output unit 15 consists of an LCD, etc., and displays or outputs to external equipment the calculated values and other information. Key input unit 16 is used for various inputting and setting operations using a keyboard. Power source 17 supplies power to light receiver 1 and controller 9.

Next, the operational procedure is explained with reference to the flow chart shown in FIG. 3.

When the switch is turned on (#1), the light emitted by sample light source 6 and reflected by beam splitter 20 enters spectral sensor 21 (#2) and the spectral distribution data detected by spectral sensor 21 is input to calculation unit 14 through spectral signal processor 22 and A/D converter 23 (#3). Based on this input data, the real tristimulus values X, Y and Z of sample light source 6 are calculated based on formulae (1) through (3) (#4).

Rotary filter 3 is then rotated until filter 3a, which has a spectral transmittance approximate to function $x(\lambda)$, enters the optical path (#5) and the output signal from each pixel of light receiving element 2 obtained in this condition is input into calculation unit 14 through light receiving signal processor 11 and A/D converter 12 (#6). This input signal is designated $X_1$ (n, m).

Rotary filter 3 is then rotated until filter 3b, which has a spectral transmittance approximate to function $y(\lambda)$, enters the optical path (#7) and the output signal from each pixel of light receiving element 2 obtained in this condition is input into calculation unit 14 through light receiving signal processor 11 and A/D converter 12 (#8). This input signal is designated $Y_1$ (n, m).

Further, rotary filter 3 is rotated until filter 3c, which has a spectral transmittance approximate to function $z(\lambda)$, enters the optical path (#9) and the output signal from each pixel of light receiving element 2 obtained in this condition is input into calculation unit 14 through light receiving signal processor 11 and A/D converter 12 (#10). This input signal is designated $Z_1$ (n, m).

Next, calculation coefficients are calculated using formulae (8) through (10) (#11), and based on these calculation coefficients, corrected tristimulus values X (n, m), Y (n, m) and Z (n, m) for each pixel are calculated using formulae (11) through (13) (#12).

Chromaticity coordinates for each pixel x and y are then calculated from corrected values X (n, m), Y (n, m) and Z (n, m) using formulae (14) and (15) (#13), and the chromaticity coordinates x and y and stimulus value Y for each pixel are displayed on display output unit 15 (#14).

Incidentally, the relationship between the output of spectral sensor 21 for the one prescribed measurement point and the output of light receiving element 2 for the light coming from that measurement point and passing through rotary filter 3 need not be sought simultaneously at the time of measurement as described above, but may be obtained separately. In other words, one or more light sources whose brightness and chromaticity are known in advance may be prepared for the purpose of correction, and the relationship between the output of light receiving element 2 and the output of spectral sensor 21, namely, functions f, g and h in formulae (4) through (6), may be sought based on the output of light receiving element 2 regarding the light coming from each light source and passing through rotary filter 3 and the output of spectral sensor 21 regarding each light source. The brightness and chromaticity for each pixel should then be sought at the time of measurement in accordance with functions f, g and h which were thus obtained in advance.

In addition, step #5 may be performed during steps #2 through #4.

Figure 4:
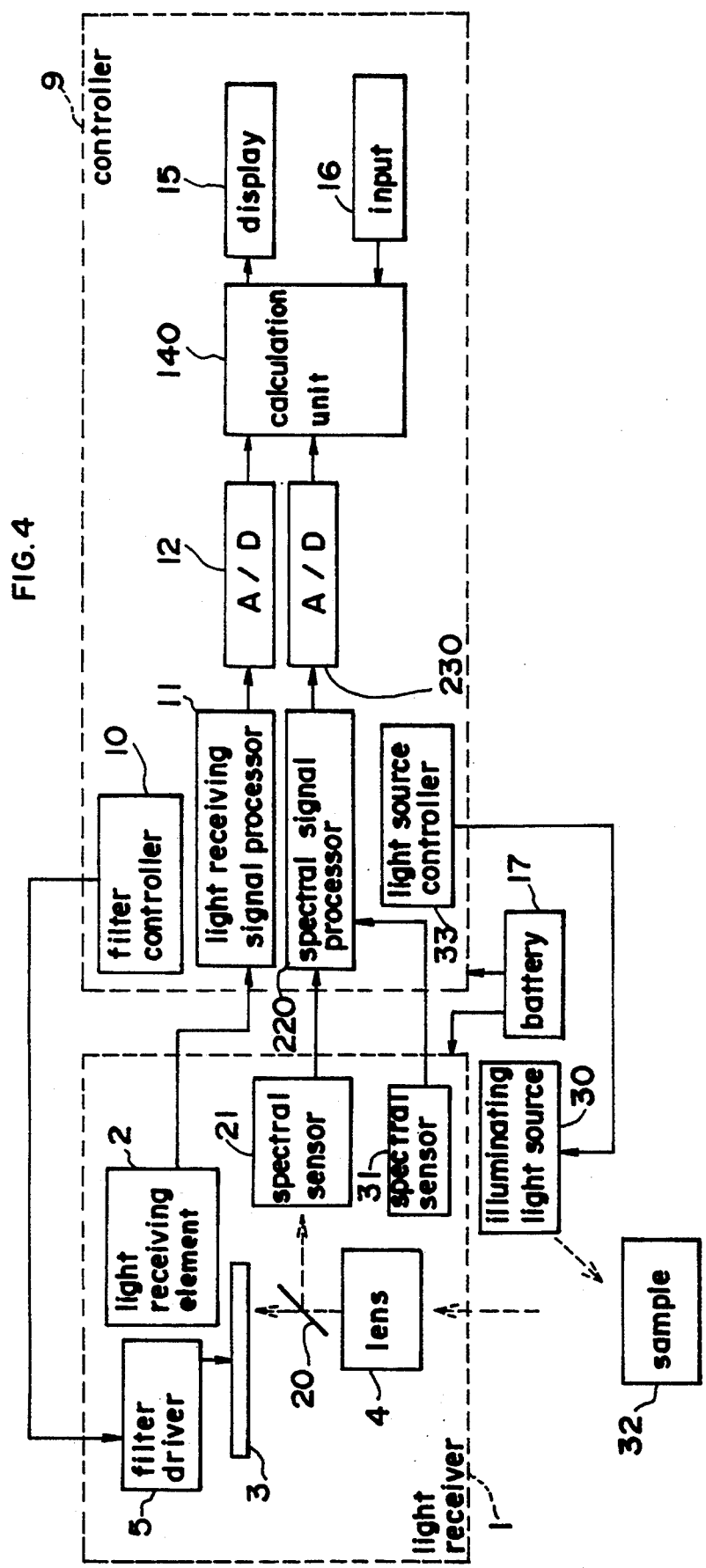
FIG. 4 is a block diagram showing the control system of the second embodiment of the two-dimensional colorimeter of the present invention.
Figure 5:
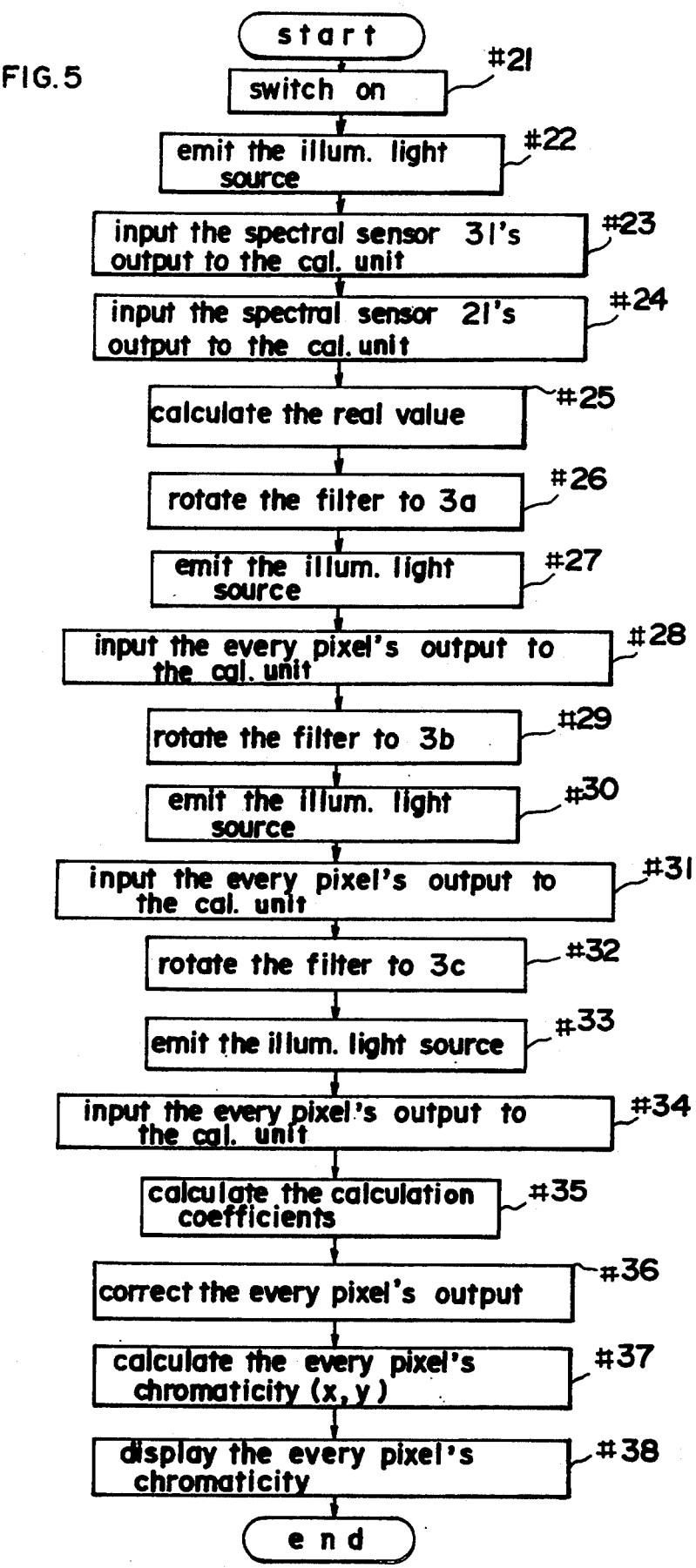
FIG. 5 is a flow chart showing the operational procedure of the second embodiment of the two-dimensional colorimeter of the present invention.

Next, a second embodiment of the colorimeter of the present invention is described with reference to FIGS. 4 and 5. The second embodiment represents an example in which the chromaticity of an object is measured. First, the general construction is described referring to the block diagram shown in FIG. 4. Components identical with those shown in FIG. 1 are given the same numbers and their explanations are omitted.

Illuminating light source 30 illuminates sample object 32, and the light reflected by sample object 32 enters light receiver 1. Spectral sensor 31 directly receives the light from illuminating light source 30 and detects its spectral distribution. Spectral signal processor 220 processes the output signals from spectral sensors 21 and 31. A/D converter 230 converts the output from spectral signal processor 220 into digital values. Light source controller 33 turns illuminating light source 30 on and off.

Calculation unit 140 has a built-in memory and performs various types of computation. It performs the same computation as calculation unit 14 shown in FIG. 1 with regard to formulae (4) through (15). However, if the spectral distribution data detected by spectral sensor 31 and input through spectral signal processor 220 and A/D converter 230 is $Q(\lambda)$, and the spectral distribution data detected by spectral sensor 21 is $P(\lambda)$, it performs computation $$X = \int \{P(\lambda)/Q(\lambda)\} \cdot x(\lambda) d\lambda \quad (21)$$

$$Y = \int \{P(\lambda)/Q(\lambda)\} \cdot y(\lambda) d\lambda \quad (22)$$

$$Z = \int \{P(\lambda)/Q(\lambda)\} \cdot z(\lambda) d\lambda \quad (23)$$

and calculates the real tristimulus values X, Y and Z of sample object 32.

Next, the operational procedure is explained with reference to the flow chart shown in FIG. 5.

When the switch is turned on (#21) and light source controller 33 turns on illuminating light source 30 (#22), the spectral distribution data detected by spectral sensor 31, which monitors illuminating light source 30, is input into calculation unit 140 through spectral signal processor 220 and A/D converter 230 (#23), while the light emitted from illuminating light source 30 and reflected by sample object 32 enters spectral sensor 21 and its spectral distribution data is input into calculation unit 140 through spectral signal processor 220 and A/D converter 230 (#24). Based on these input data, the real tristimulus values X, Y and Z of sample object 32 are calculated according to formulae (21) through (23) (#25).

Rotary filter 3 is then rotated until filter 3a, which has a spectral transmittance approximate to function $x(\lambda)$, enters the optical path (#26) and illuminating light source 30 is turned on by light source controller 33 (#27). The output signal from each pixel of light receiving element 2 obtained in this condition is then input into calculation unit 140 through light receiving signal processor 11 and A/D converter 12 (#28). This input signal is designated $X_1$ (n, m).

Rotary filter 3 is then rotated until filter 3b, which has a spectral transmittance approximate to function $y(\lambda)$, enters the optical path (#29) and illuminating light source 30 is turned on by light source controller 33 (#30). The output signal from each pixel of light receiving element 2 obtained in this condition is then input into calculation unit 140 through light receiving signal processor 11 and A/D converter 12 (#31). This input signal is designated $Y_1$ (n, m).

Further, rotary filter 3 is rotated until filter 3c, which has a spectral transmittance approximate to function $z(\lambda)$, enters the optical path (#32) and illuminating light source 30 is turned on by light source controller 33 (#33). The output signal from each pixel of light receiving element 2 obtained in this condition is then input into calculation unit 140 through light receiving signal processor 11 and A/D converter 12 (#34). This input signal is designated $Z_1$ (n, m).

Next, the calculation coefficients are calculated according to formulae (8) through (10) (#35), and based on these coefficients, the corrected tristimulus values X(n, m), Y(n, m) and Z(n, m) for each pixel are calculated using formulae (11) through (13) (#36).

Chromaticity coordinates x and y for each pixel are then calculated from corrected values X(n, m), Y(n, m) and Z(n, m) according to formulae (14) and (15) (#37) and chromaticity coordinates x and y and stimulus value Y for each pixel are displayed on display output unit 15 (#38).

Incidentally, where illuminating light source 30 is one which emits light only for an instant, like a xenon tube, etc., or where the spectral emissivity of illuminating light source 30 is unstable, steps #23 and #24 must occur simultaneously or within a sufficiently short period of time.

In addition, in formulae (21) through (23), normalization is attained based on the spectral emissivity of illuminating light source 30, but if the spectral emissivity of illuminating light source 30 is stable, the spectral reflectance $Q(\lambda)$ of illuminating light source 30 may be stored in the built-in memory of calculation unit 140 in advance. In this case, the operation of step #23 is not needed.

Moreover, the relationship between the output of spectral sensor 21 for the one prescribed measurement point and the output of light receiving element 2 for the light coming from that measurement point and passing through rotary filter 3 need not be sought simultaneously at the time of measurement as described above, but may be obtained separately. In other words, one or more objects whose chromaticity x and y as well as stimulus value Y are known in advance may be prepared for the purpose of correction, and the relationship between the output of light receiving element 2 and the output of spectral sensor 21, namely, functions f, g and h in formulae (4) through (6), may be sought based on the output of light receiving element 2 regarding the light emitted by the illuminating light source, reflected by each object and then passing through rotary filter 3 and the output of spectral sensor 21 regarding the same reflected light. The chromaticity for each pixel should then be sought at the time of measurement in accordance with functions f, g and h which were thus obtained in advance.

Incidentally, while the filter with spectral transmittances approximate to $x(\lambda)$, $y(\lambda)$ and $z(\lambda)$ is obtained using rotary filter 3 in the above embodiments, it may be obtained using the following methods as well.

Figure 6:
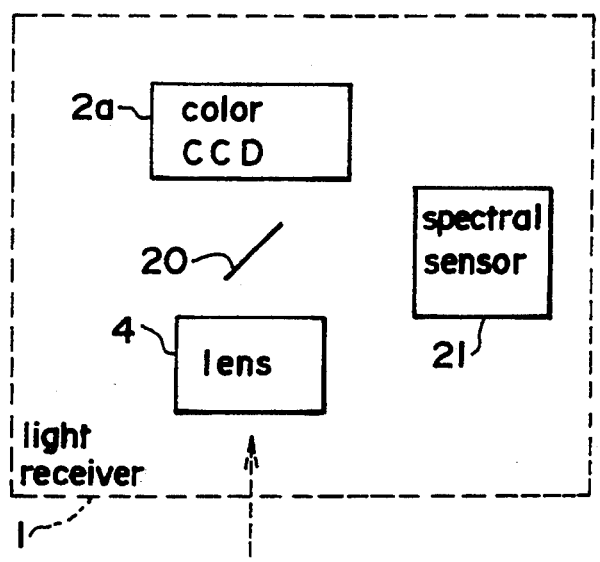
FIG. 6 is a block diagram showing another embodiment of the light receiving means of the present invention.

For example, as shown in FIG. 6, rotary filter 3 may be removed and color CCD 2a may be used as light receiving element 2.

Figure 7:
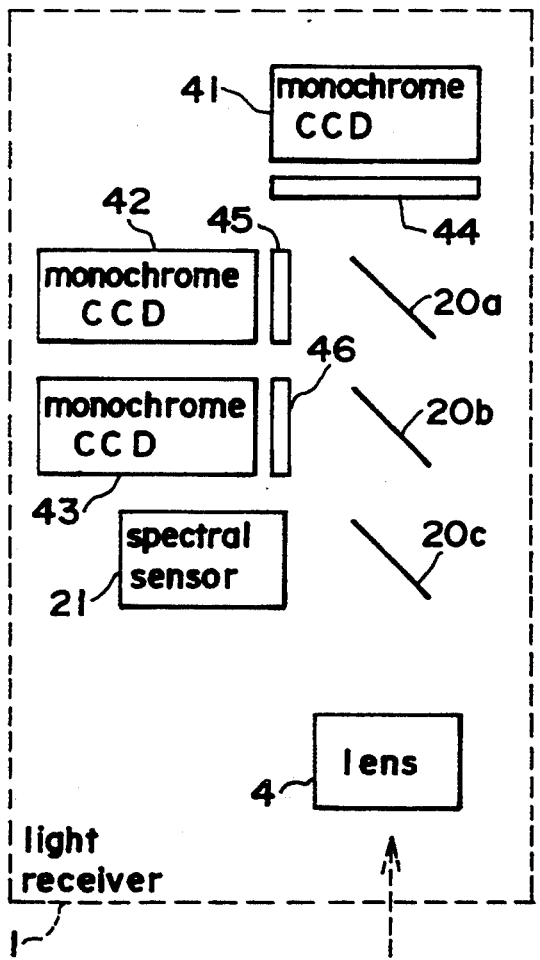
FIG. 7 is a block diagram showing yet another embodiment of the light receiving means of the present invention.

In addition, as shown in FIG. 7, filters 44, 45 and 46, having a spectral transmittance approximate to functions $x(\lambda)$, $y(\lambda)$ and $z(\lambda)$, respectively, may be located separately such that the light made to converge by optical lens 4 is led to monochrome CCDs 41, 42 and 43, as well as to spectral sensor 21, via beam splitters 47, 48 and 49.

Further, in the above embodiments, if measurement values are to be obtained using a colorimetric reference system other than the CIE standard XYZ colorimetric reference system, optical filters suitable for that colorimetric reference system should be used.

What is claimed is:

1. A two-dimensional colorimeter capable of measuring chromaticity at multiple points on a sample, comprising:
   a first light receiving means for receiving light from multiple points on the sample and for converting the received light into first electric signals corresponding to the respective points;
   a filter means located between the sample and said first light receiving means, for receiving light from the sample and for allowing only specific wavelength elements to pass through it;
   a second light receiving means for receiving light from one prescribed point among said multiple points and for converting the light into a second electric signal;
   a spectral separating means located between the sample and said second light receiving means, for separating the light from the sample into primary wavelength elements; and
   a correcting means for correcting the first signals output by said first light receiving means based on the second signal output by said second light receiving means.

2. A two-dimensional colorimeter claimed in claim 1, further comprising a calculating means for calculating correcting coefficients based on the first and second signals corresponding to said one prescribed point and said correcting means corrects the first signals using the correcting coefficients.

3. A two-dimensional colorimeter claimed in claim 1, further comprising a beam splitting means for splitting the light from the sample and for leading the split light beams to said first and second light receiving means.

4. A two-dimensional colorimeter claimed in claim 1, wherein said first light receiving means is a two-dimensional area sensor.

5. A two-dimensional colorimeter capable of measuring chromaticity at multiple points on a sample, comprising:
   a first light receiving means for receiving light from multiple measurement points on the sample and for converting the light into first electric signals corresponding to the respective points;
   a first optical filter which receives light from the sample and allows only a first wavelength element to pass through it;
   a second optical filter which receives light from the sample and allows only a second wavelength element to pass through it;
   a third optical filter which receives light from the sample and allows only a third wavelength element to pass through it;
   a placing means for sequentially placing said first, second and third filters between the sample and said first light receiving means;
   a first calculating means for calculating the chromaticity at said multiple measurement points based on the first electric signals;
   a second light receiving means for receiving light from one prescribed point among said multiple measurement points and for converting the light into a second electric signal;
   a spectral optical filter located between the sample and said second light receiving means, for separating the light from the sample into primary wavelength elements;
   a second calculating means for calculating the chromaticity at said prescribed point based on the second electric signal;
   a determining means for determining correcting coefficients based on the first and second electric signals corresponding to said prescribed point; and
   a correcting means for correcting the chromaticity at said multiple measurement points in accordance with the correcting coefficients.

6. A two-dimensional colorimeter claimed in claim 5, further comprising a beam splitting means for splitting the light from the sample and for leading the split light beams to said first and second light receiving means.

7. A two-dimensional colorimeter claimed in claim 5, wherein said first light receiving means is a two-dimensional area sensor.

* * * * *